United States Patent
Riedl

(10) Patent No.: US 7,190,100 B2
(45) Date of Patent: Mar. 13, 2007

(54) ELECTRICALLY DRIVEN POWER TOOL

(75) Inventor: Reinhard Riedl, Finning (DE)

(73) Assignee: Hilti Aktiengesellschaft, Schaan (LI)

( * ) Notice: Subject to any disclaimer, the term of this patent is extended or adjusted under 35 U.S.C. 154(b) by 32 days.

(21) Appl. No.: 11/205,226

(22) Filed: Aug. 15, 2005

(65) Prior Publication Data

US 2006/0033399 A1 Feb. 16, 2006

(30) Foreign Application Priority Data

Aug. 16, 2004 (DE) ............... 10 2004 039 611

(51) Int. Cl.
*H02K 13/00* (2006.01)
(52) U.S. Cl. ............................ 310/239; 310/50
(58) Field of Classification Search ........... 310/239, 310/240, 241, 50
See application file for complete search history.

(56) References Cited

U.S. PATENT DOCUMENTS 4,978,877 A * 12/1990 Quirijnen ............... 310/239
5,955,802 A * 9/1999 Karasa et al. ............ 310/50
6,930,431 B2 * 8/2005 Buck et al. ............. 310/239

* cited by examiner

*Primary Examiner*—Darren Schuberg
*Assistant Examiner*—Nguyen Hanh
(74) *Attorney, Agent, or Firm*—Abelman, Frayne, Schwab

(57) ABSTRACT

A power tool includes an electric motor (6) located in the tool housing (4) and capable of rotation in both clockwise and counterclockwise directions, a brush carrier (14) carrying at least two brushes (2) that electrically contacts the commutator (12) of the motor (6), an actuation member (26) accessible from outside of the housing (4) for rotating the brush carrier (14) relative to the housing (4) in a circumferential direction (U) of the commutator (12) between clockwise rotational position and counterclockwise rotational position, and a device for preloading the brush carrier (14) in both clockwise and counterclockwise rotational positions and having at least one spring member (32) for biasing the brush carrier (14) both in the circumferential direction (U) and the axial direction of the commutator (12).

7 Claims, 4 Drawing Sheets

ELECTRICALLY DRIVEN POWER TOOL

BACKGROUND OF THE INVENTION

1. Field of the Invention

The present invention relates to a power tool having a housing, an electrical motor located in the housing and capable of rotation in both clockwise and counterclockwise directions, and having a commutator rotatable about an axis of the motor. The power tool further includes a brush carrier carrying at least two brushes that electrically contacts the commutator of the motor and an actuation member accessible from outside of the housing for rotating the brush carrier relative to the housing in a circumferential direction of the commutator between clockwise rotational position and counterclockwise rotational positions. The power tool also includes a device for preloading the brush carrier in both clockwise and counterclockwise rotational positions.

2. Description of the Prior Art

In power tools with a rotatable brush carrier of the type described above, the rotational positions are set in such a way that an optimal commutation takes place. Upon rotation of the brush carrier between rotational positions, the polarity of the motor connections changes whereby the rotational direction of the power tool also changes.

German Publication DE 101 52 963 discloses an electrical tool in which a bi-stable spring member engages the brush carrier and biases the brush carrier, after the brush carrier passed on unstable intermediate position, in a circumferential direction to one of two rotational positions. The spring member is formed as a leg spring which is arranged between the brush carrier and the housing and has one of its leg engaging the housing and its other leg engaging the brush carrier. In the axial direction, the brush carrier is supported against the housing at both of its sides.

The known preloading device insures a stable retention of the brush carrier in both rotational positions. In this way, in both rotational positions, a reliable and optimal commutation is achieved. In addition, a comfortable switching from one rotational position to another rotational position is achieved.

A drawback of the known preloading device of a power tool consists in that an axial or normal backlash between the brush carrier and the housing, which is necessary for a rotatable support of the brush carrier, is determined by the housing. Therefore, the manufacturing tolerances during manufacturing of the housing, temperature-induced deformation of the housing, in particular resulting form heating of the tool during operation, lead to disturbances during switching between rotational positions and to an erroneous position of the brush carrier relative to the commutator.

An erroneous position of the brush carrier relative to the commutator can lead to a poor commutation which, in turn, can result in a poor performance of the power tool.

Accordingly, an object of the present invention is a power tool in which the foregoing drawbacks are eliminated.

Another object of the present invention is a power tool which, having a simplified construction, would insure a stable and precise positioning of the brush carrier.

SUMMARY OF THE INVENTION

These and other objects of the present invention, which will become apparent hereinafter, are achieved by providing in a power tool, a device for preloading the brush carrier in both clockwise and counterclockwise rotational position and having at least one spring member for biasing the brush carrier both in the circumferential direction and in the axial direction of the commutator.

The inventive device insurers that the brush carrier is preloaded not only in the circumferential direction in each rotational position but also in a desired axial position. The preloading of the brush carrier in its axial position permits to eliminate disturbances which are caused by an axial backlash between the housing and the brush carrier. According to the invention, a single spring member preloads the brush carrier in both circumferential direction and the axial direction, which reduces manufacturing costs and facilitates assembly of the tool.

Advantageously, the spring member has two substantially mirror-symmetrical, opposite arcuate sections connected with each other. Thereby the spring member, while having a simple shape, can produce biasing forces acting in two opposite directions transverse to the arcuate sections and in a tangential direction of an arcuate section.

According to a particular advantageous embodiment of the present invention, the spring member has an elongate base element that forms substantially a loop. A wire or strip-shaped material, in particular metal, can form the elongate base element. In this case, the spring member can be particularly cost-effectively produced.

Advantageously, the base element is formed as a single leaf spring. In this case, the spring member can produce a sufficiently large biasing force.

Advantageously, the spring member has, on its two opposite sides, an engagement profile, respectively, that in an assembly condition of the power tool, is engageable, respectively, with a counter engagement profile fixedly securable to the housing and a counter engagement profile of the brush carrier. In this case, the spring member can be mounted particularly easily, and the elements, which are necessary for establishing connections between the spring member and the housing and the brush carrier, can be produced particularly cost-effectively.

Advantageously, the preloading device has at least two spring members, which insure that the brush carrier can be secured particularly stably in both the circumferential direction and the axial direction.

It is particularly beneficial when the two spring members are inclined, with respect to the commutator axis, relative to each other in opposite directions. This insures that the preloading device additionally centers the brush carrier relative to the commutator axis.

The novel of the features of the present invention, which are considered as characteristic for the invention, are set forth in the appended claims. The invention itself, however, both as to its construction and its mode of operation, together with additional advantages and objects thereof, will be best understood form the following detailed description of a preferred embodiment, when read with reference to the accompanying drawings.

DETAILED DESCRIPTION OF THE PREFERRED EMBODIMENTS

Figure 1:
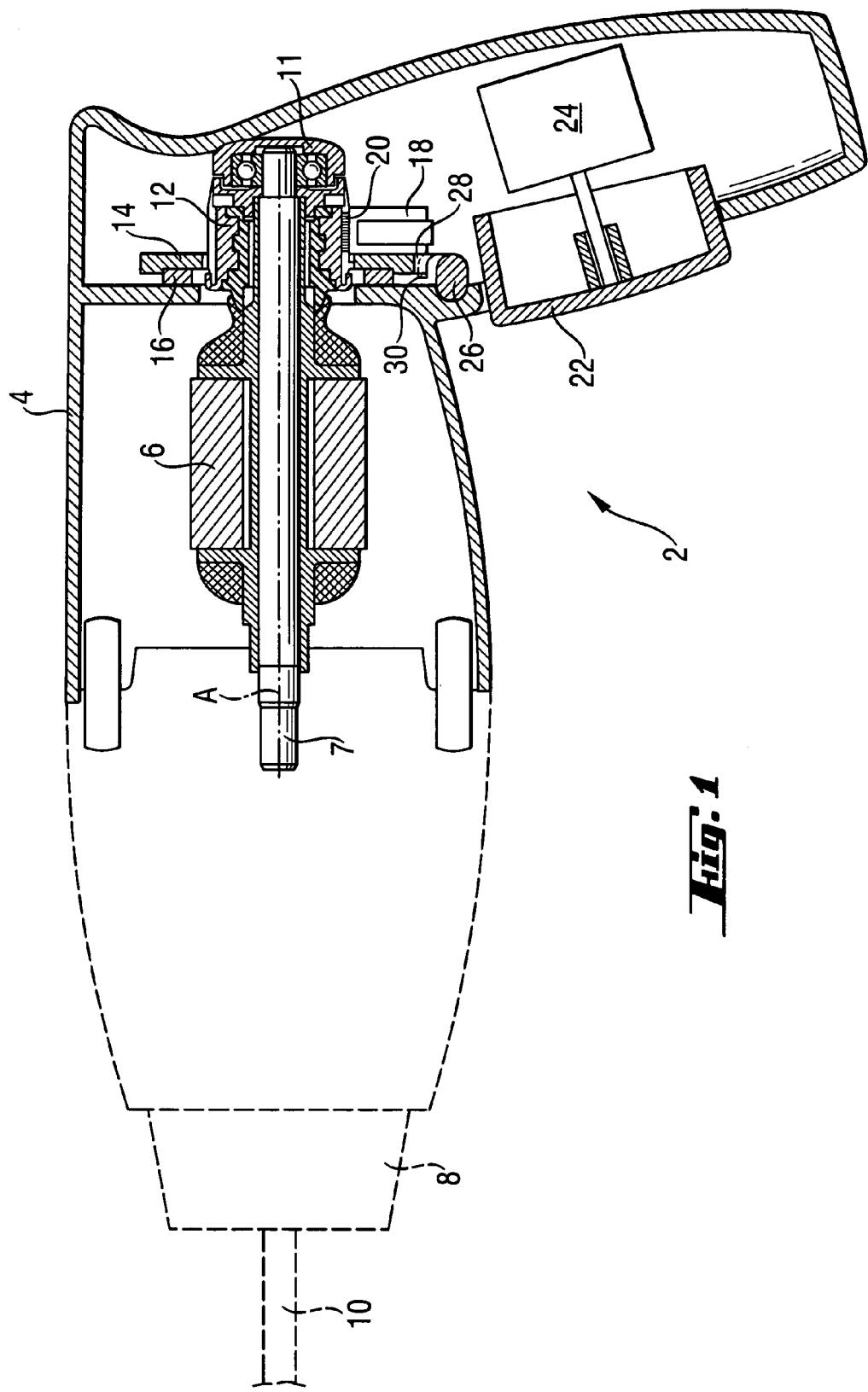
FIG. 1 a side, partially cross-sectional view of a power tool according to the present invention.

A power tool 2, which is shown in FIG. 1, can be formed as a power screwdriver or drill. The power tool 2 has a housing 4 in which a motor 6 is located. The motor 6 drives a shaft 7 which is connected with a chuck 8 for joint rotation therewith. The chuck 8 is designed for receiving a working tool 10, e.g., a drill or a screw-driving bit. The shaft 7 is rotatably supported, at its end remote from the chuck 8, in a bearing block 11 fixedly secured in the housing 4.

The rotation of the motor 6 is switchable between clockwise rotation and counterclockwise rotation. To this end, an annular brush carrier 14, which is rotatable about a commutator 12 of the motor 6, is supported for a limited rotation in a support ring 16 fixedly secured in the housing 4. The brush carrier 14 carries two brush guides 18 in which there are arranged, respectively, carbon brushes 20 that form an electrical contact with the commutator 12 of the motor 6. For rotating of the brush carrier 14 about the axis A of the motor or the commutator 12, there is provided in the housing 4 above a push-piece 22 of the motor switch 24, an actuation member 26.

Figure 2:
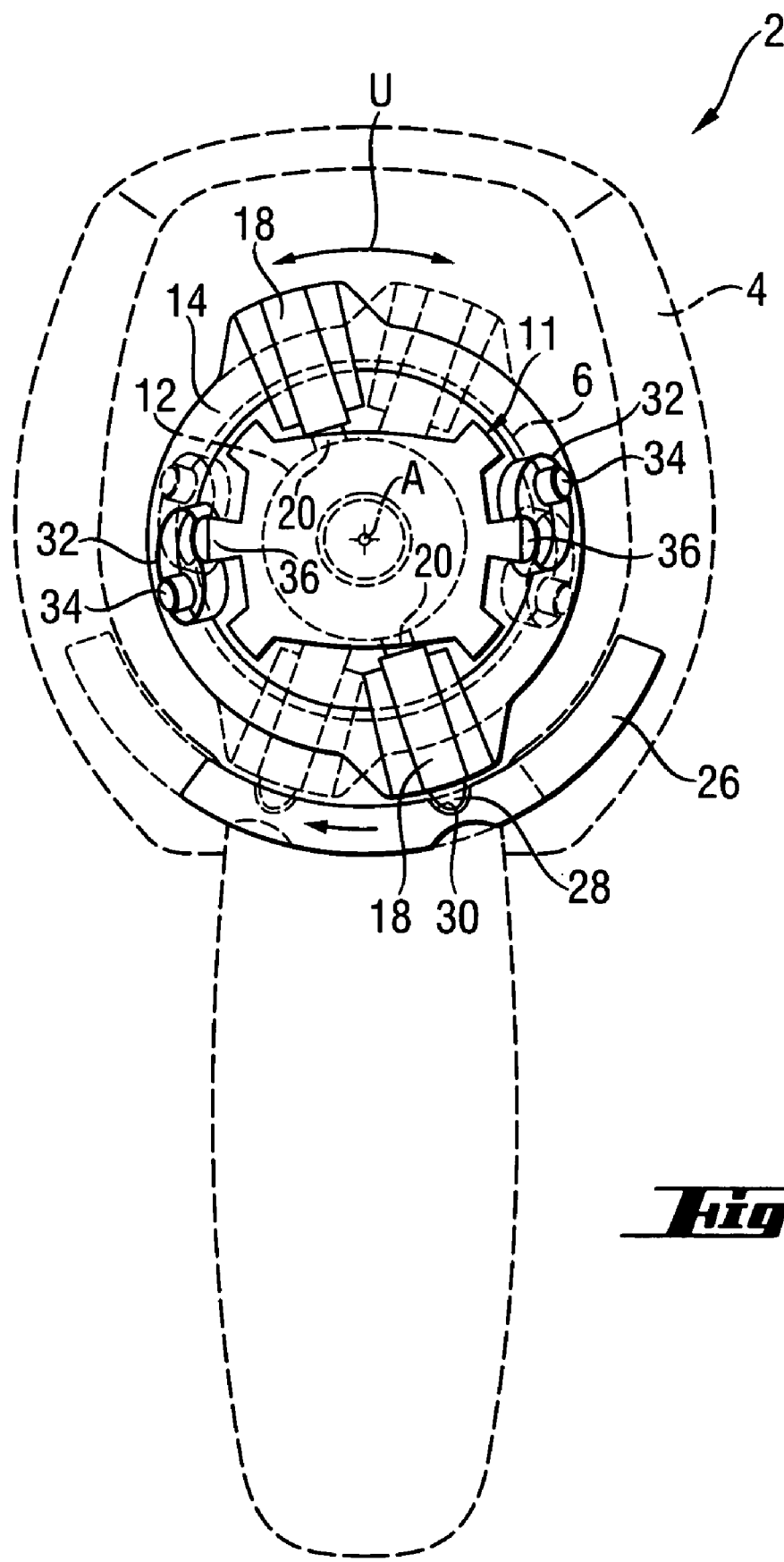
FIG. 2 a rear view of a preloading device used in the power tool shown in FIG. 1.

As particularly shown in FIG. 2, the actuation member 26 is formed as an arch-shaped part that is supported on the housing 4 for displacement about the axis A. On the brush carrier 14, there is provided a cam 28 that engages in a entraining recess 30 in the actuation member 26. Upon applying pressure to an end of the actuation member 26 which projects out of the housing 44, the brush carrier 14 can be displaced from a clockwise rotational position, which is shown in the drawings, in the circumferential direction U of the commutator 12, to a counterclockwise rotational position shown with dash lines.

Between the brush carrier 14 and the bearing block 11, there is provided a preloading device having two looped spring members 32. Both spring members 32 are supported, respectively, on carrier cams 34 of the brush carrier 14 and support cams 36 projecting form the bearing block 11, so that the spring members 32 bias the brush carrier 14 in the axial direction against the support ring 16.

In both the clockwise rotational direction and the counterclockwise rotational direction, the carrier cams 34 are somewhat offset in the circumferential direction U relative to the support cams 36. Thereby, the spring members 32 produce, in addition to the axial biasing, a force component acting in the circumferential direction U and biasing the brush carrier 14 to a respective actual rotational direction.

Figure 3:
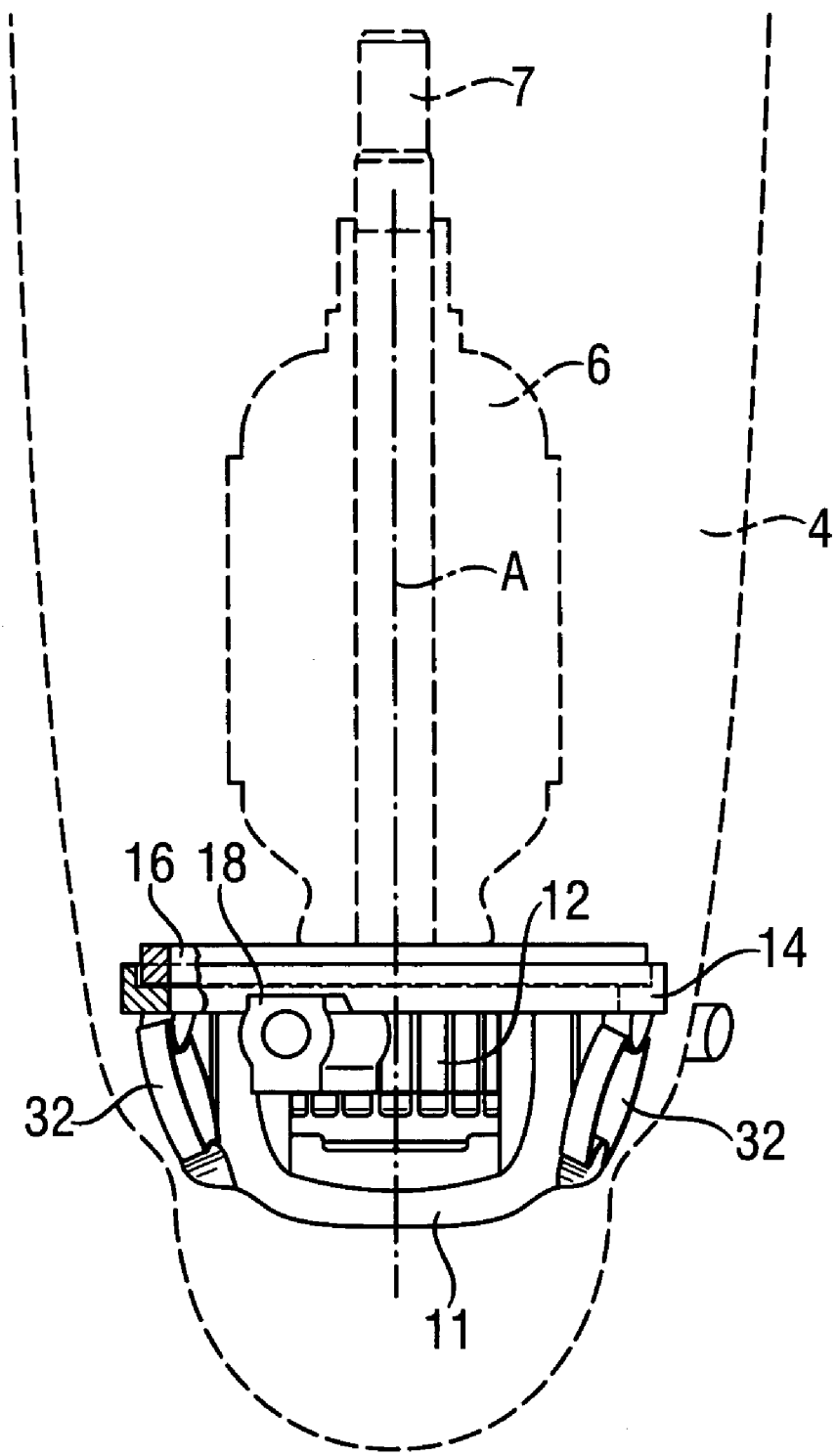
FIG. 3 a plan view of the preloading device show in FIG. 2.

As particularly shown in FIG. 3, the spring members 32 are inclined outwardly with respect to the axis A of the brush carrier 14. This insures centering of the brush carrier 14 relative to the commutator 12.

Figure 4:
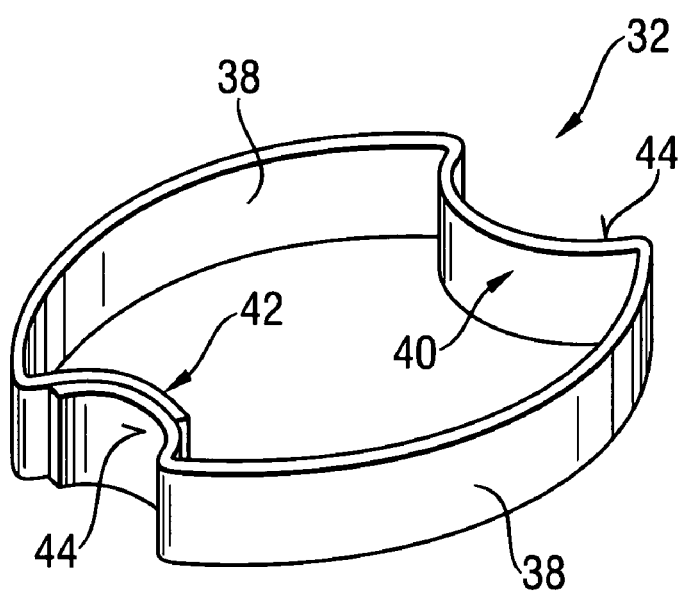
FIG. 4 a perspective view of a spring member of the preloading device according to FIGS. 2–3.
Figure 5:
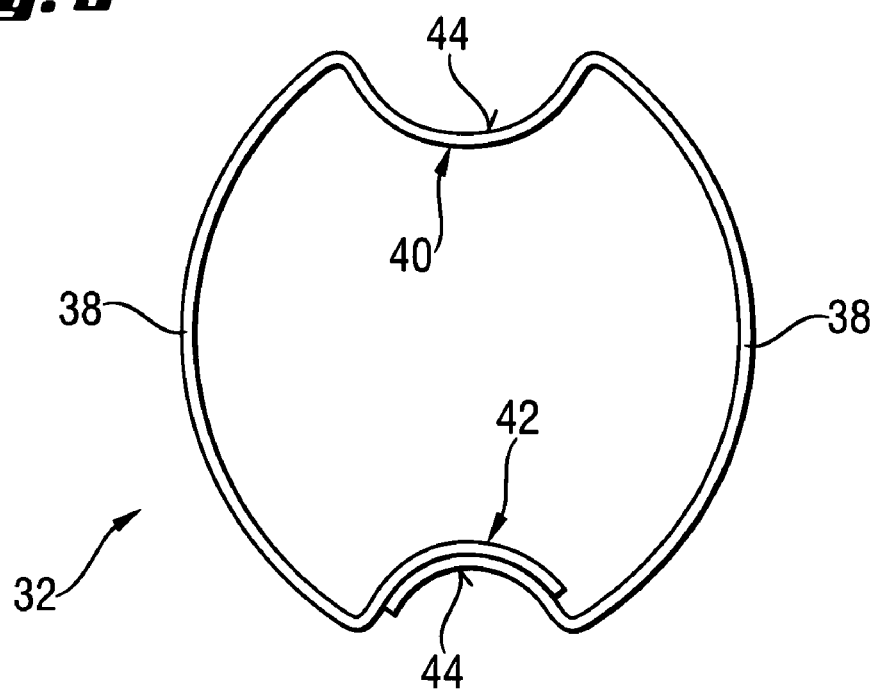
FIG. 5 a plan view of the spring member shown in FIG. 4.

As shown in FIGS. 4–5, the spring members 32 are formed as a single leaf spring that substantially forms a loop. The spring members 32 have each two arcuate sections 38 which are arranged mirror-symmetrically relative to each other and are connected with a connection section 40. Opposite the connection section 40, the two ends of the single leaf spring overlap each other, forming an overlapping section 42. Both the connection section 40 and the overlapping section 42 extend inwardly in the loop, forming engagement profiles 44 that are adapted to the shapes of the carrier cams 34 and the support cams 36. The carrier cams 34 and the support cams 36 form a counter profile that the spring member 32 engages when the spring member 32 is pinned on during the assembly.

During the assembly, the spring members 32 are so mounted between the brush carrier 14 and the bearing block 11 that the arcuate sections 38 are permanently deformed outwardly in comparison with the position shown in FIGS. 4–5. As a result, the restoring forces of the arcuate sections 38 bias the connection section 40 and the overlapping section 42 away from each other. Thereby, the brush carrier 14 is permanently pressed in the axial direction against the support ring 16 and away from the bearing block 11. Simultaneously, the spring members 32 bias the brush carrier 14 in the circumferential direction U into the set position.

Upon actuation of the actuation member 26, the brush carrier 14 is rotated from its actual rotational position against the biasing force of the spring members 32 to an unstable dead point in which the arcuate sections 38 are deformed to a maximum. Immediately after they pass the dead point, the arcuate sections 38 assume their initial position, biasing jerkily the brush carrier 14 into a new rotational position.

Through the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the sprit and scope of the present invention as defined by the appended claims.

What is claimed is:

1. A power tool, comprising:
    a housing (4);
    an electrical motor (6) located in the housing (4), rotatable in clockwise and counterclockwise rotational directions, and having a commutator (12) rotatable about an axis (A) of the motor (6);
    a brush carrier (14) carrying at least two brushes (2) that electrically contact the commutator (12) of the motor (6);
    an actuation member (26) accessible from outside of the housing (4) for rotating the brush carrier (14) relative to the housing (4) in a circumferential direction (U) of the commutator (12) between clockwise rotational position and counterclockwise rotational position; and
    a device for preloading the brush carrier (14) in both the clockwise and counterclockwise rotational positions and having at least one spring member (32) for biasing the brush carrier (14) both in the circumferential direction (U) and an axial direction of the commutator (12).

2. A power tool according to claim 1, wherein the at least one spring member (32) has two arcuate sections (38) arranged opposite each other and connected with each other.

3. A power tool according to claim 1, wherein the at least one spring member (32) has an elongate base element that forms substantially a loop.

4. A power tool according to claim 3, wherein the elongate base element is formed as a single leaf spring.

5. A power tool according to claim 1, wherein the at least one spring member (32) has, on two opposite sites thereof, an engagement profile (44), respectively, that in an assembly condition of the power tool, is engageable, respectively, with a counter engagement profile fixedly securable to the housing (4) and a counter engagement profile of the brush carrier (14).

6. A power tool according to claim 1, wherein the preloading device has at least two spring members (32).

7. A power tool according to claim 6, wherein the at least two spring members (32) are inclined with respect to the axis (A) of the commutator (12) in opposite directions.

\* \* \* \* \*